United States Patent
Scaramucci

[15] 3,671,010
[45] June 20, 1972

[54] VALVE ASSEMBLY WITH DROP-TYPE STEM

[72] Inventor: Domer Scaramucci, 3245 South Hattie, Oklahoma City, Okla. 73129

[22] Filed: Dec. 5, 1968

[21] Appl. No.: 781,310

[52] U.S. Cl. ..................... 251/151, 251/315, 251/317
[51] Int. Cl. ........................................... F16h 51/00
[58] Field of Search ............. 137/375, 454.2; 251/172, 148, 251/291, 315, 312

[56] References Cited

UNITED STATES PATENTS

| | | | |
|---|---|---|---|
| 3,232,579 | 2/1966 | Jeffrey | 251/312 |
| 2,092,261 | 9/1937 | Rector | 251/291 X |
| 2,810,542 | 10/1957 | Bryant | 251/172 |
| 3,038,489 | 6/1962 | Allen | 251/172 X |
| 3,076,631 | 2/1963 | Grove | 251/315 X |
| 3,192,945 | 7/1965 | Blakeley | 137/375 |
| 3,219,054 | 11/1965 | Elder | 251/291 X |
| 3,253,815 | 5/1966 | Stillwagon | 251/148 |
| 3,260,544 | 7/1966 | Hathaway | 251/291 X |
| 3,306,316 | 2/1967 | Stillwagon | 137/375 |
| 3,380,706 | 4/1968 | Scaramucci | 251/148 |
| 3,380,708 | 4/1968 | Scaramucci | 251/172 |
| 3,398,926 | 8/1968 | Scaramucci | 251/172 |

*Primary Examiner*—Harold W. Weakley
*Attorney*—Dunlap, Laney, Hessin & Dougherty

[57] ABSTRACT

A valve assembly, particularly useful between flanges, which utilizes a housing unit and a separate valve unit. The housing unit provides a supporting housing adapted to be supported between the flanges and to include a valve operator and a first valve stem. The valve unit is sized to be inserted in the housing unit and includes the valve member, seats, and at least one additional valve stem. The valve stem carried by the housing unit is insertable lengthwise into connection with the valve stem of the valve unit. In an assembled position, the valve unit is sealed against the flanges and prevents the housing unit from being contacted by fluid controlled by the valve.

43 Claims, 10 Drawing Figures

INVENTOR.
DOMER SCARAMUCCI
BY
Dunlap, Laney, Hessin & Dougherty
ATTORNEYS

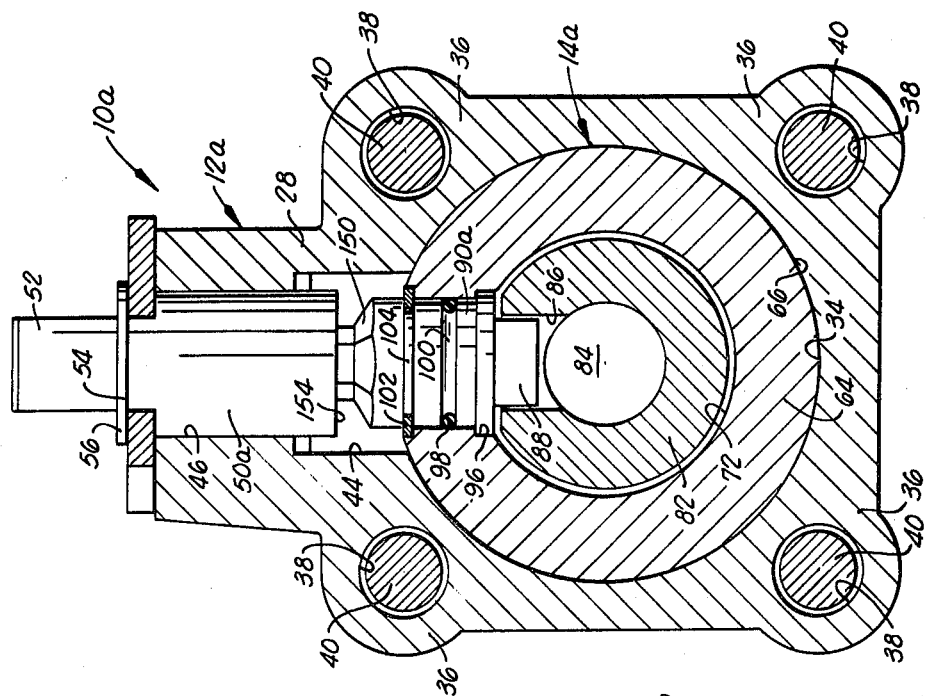
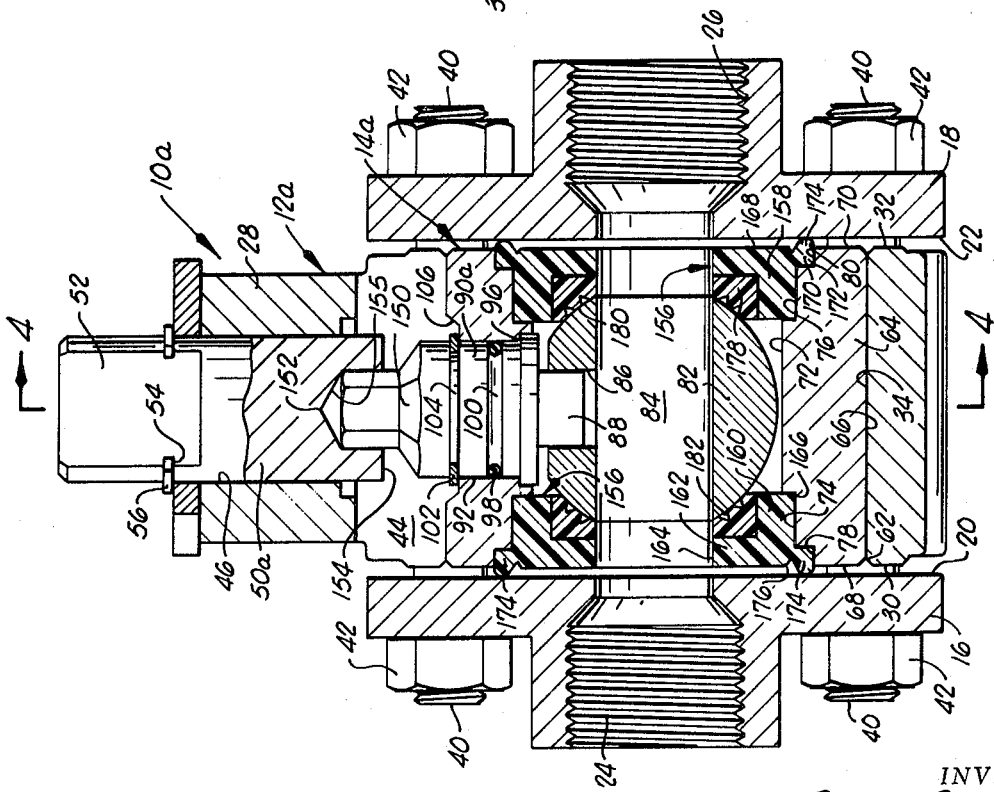

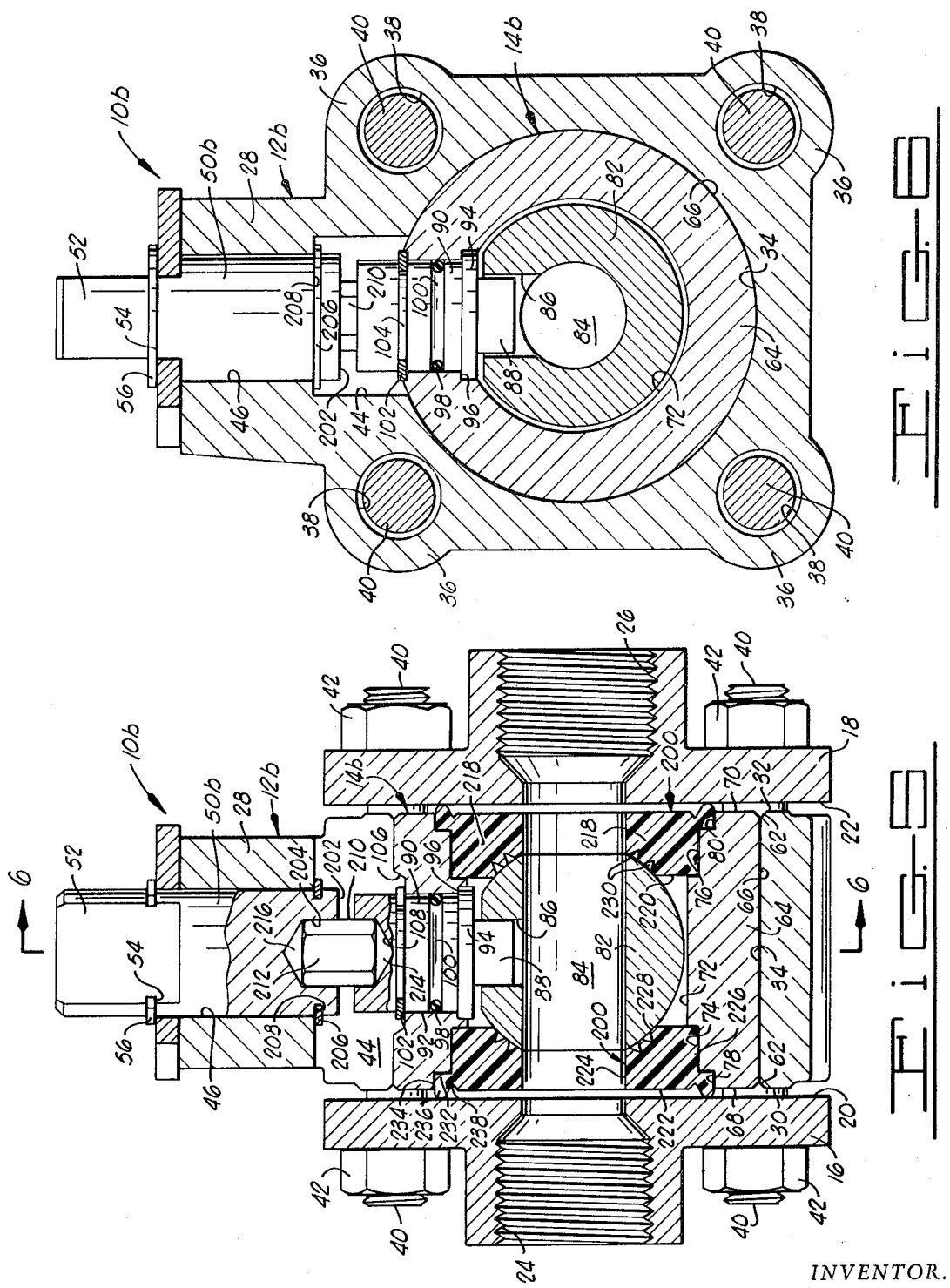

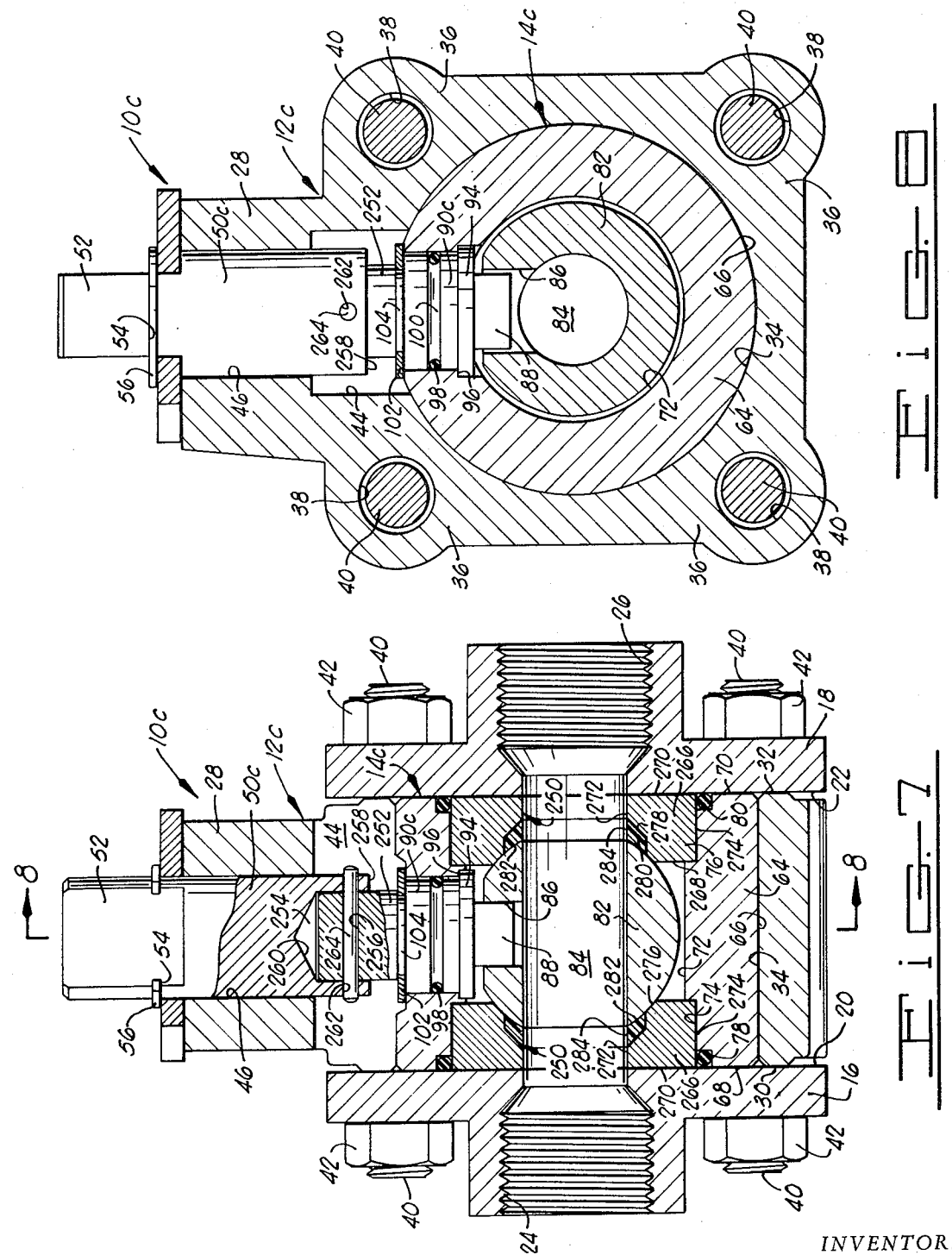

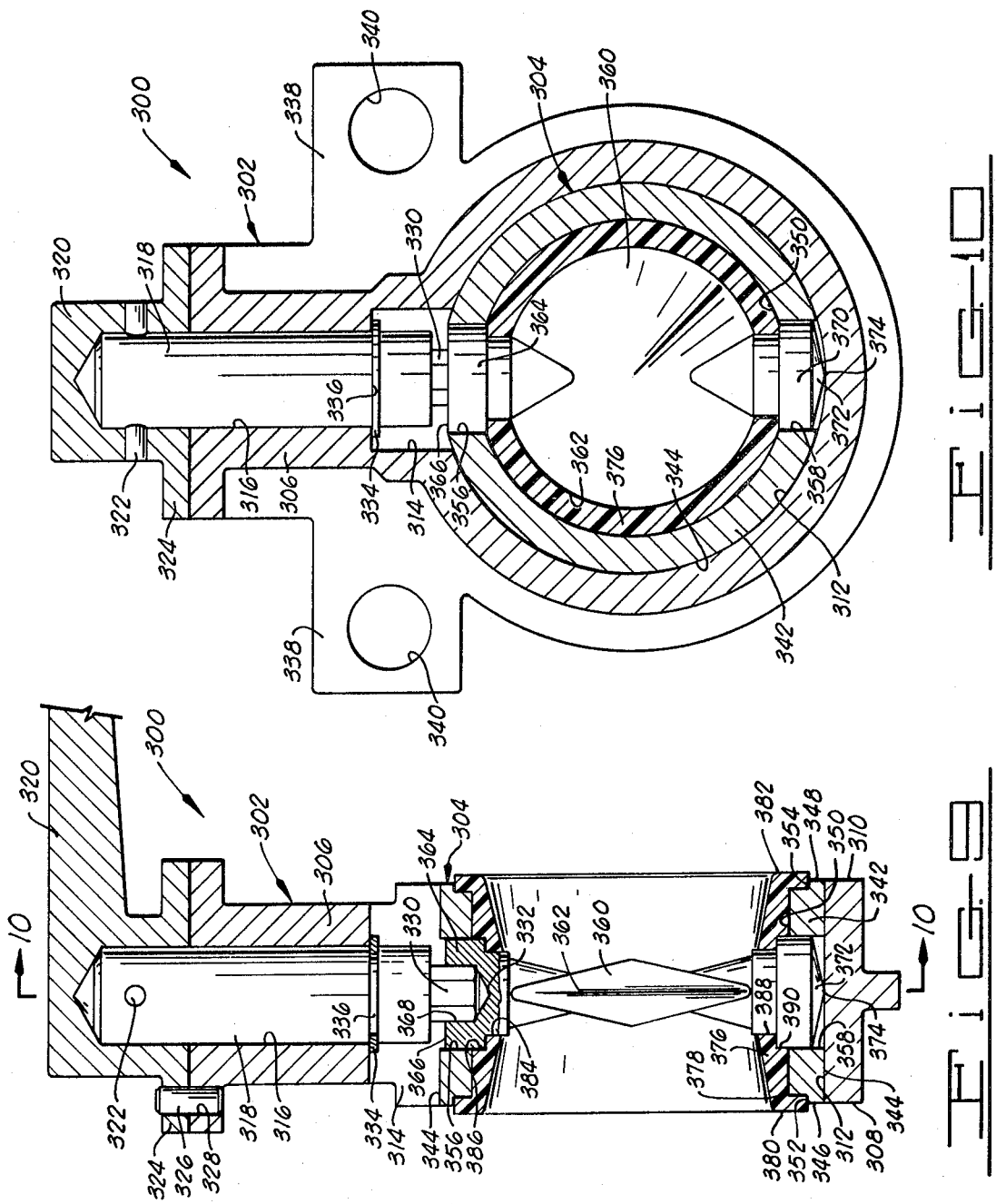

VALVE ASSEMBLY WITH DROP-TYPE STEM

CROSS-REFERENCE TO RELATED APPLICATION

Related subject matter is disclosed in applicant's co-pending application entitled "Valve Assembly with Insertable Valve Unit," Ser. No. 763,644 filed Sept. 30, 1968, now U.S. Pat. No. 3,531,081.

BACKGROUND OF THE INVENTION

1. Field of the Invention

This invention relates generally to an improved valve assembly utilizing a housing unit and a separate valve unit, and more particularly, but not by way of limitation, to an improved valve assembly utilizing a housing unit and a separate valve unit wherein the valve stem carried by the housing unit is inserted lengthwise for interconnecting the housing unit valve stem with the valve unit valve stem.

2. Description of the Prior Art

Ordinarily, a valve assembly utilizes a single valve stem for operating the valve member, with the valve stem being sealed in a mating aperture in the valve body and having a handle or other valve operator on the outer end thereof. When a valve operator is used, it is normally mounted directly on the valve body.

Repair of a valve assembly of the above type frequently requires removal of the valve stem. If the valve stem is not removed and replaced with great care and with the proper tools, the seal between the stem and the valve body is easily damaged. Repair of the valves in the field is therefore avoided whenever possible.

In prior valve assemblies, the valve body provides the necessary structural strength for the valve assembly, and yet is normally exposed to the fluid being controlled by the valve assembly. Therefore, in those situations where the valve assembly is used to control highly corrosive fluids, requiring what may be considered exotic materials of construction for those parts in contact with the fluid, the resulting valve assembly is unduly expensive.

SUMMARY OF THE INVENTION

This invention contemplates a valve assembly for controlling the flow of fluid between adjacent pipe sections which includes a housing unit comprising a housing having a bore extending therethrough, and valve stem supported by the housing. Means are provided supporting the housing between the adjacent ends of the pipe sections. A valve unit, insertable in the housing, comprises a valve body having a valve chamber therein communicating with the opposite ends of the valve body and means sealing the opposite ends of the valve body to the pipe sections to prevent the fluid being controlled from contacting the housing. A valve member is supported in the valve body for opening and closing the valve assembly, and a stem is supported in the valve body and is adapted to be connected to the valve stem carried by the housing unit when the valve unit is inserted in the housing unit, whereby the opening and closing movements of the valve member may be controlled by operation of the valve stem carried by the housing unit.

An object of the invention is to facilitate the repair of valve assemblies in the field.

Another object of this invention is to provide a valve assembly wherein the cost of the parts of the valve assembly exposed to the fluid being controlled by the assembly is reduced to a minimum.

Another object of this invention is to provide a valve assembly having first and second valve stems, wherein the alignment of the valve stems is assured.

A further object of the invention is to provide a valve assembly having a housing unit including a valve stem, and a separate valve unit, wherein the valve stem carried by the housing unit requires no seals.

Another object of the invention is to provide a valve assembly including a housing unit having a valve stem, and a separate valve unit, wherein the valve stem carried by the housing unit is installed and connected to a valve stem in the valve unit by lengthwise movement of the first mentioned valve stem.

A further object of the invention is to provide a valve assembly which may be economically manufactured, which may be repaired in the field in a minimum of time, and which will have a long service life.

Other objects and advantages of the invention will be evident from the following detailed description when read in conjunction with the accompanying drawings which illustrate preferred embodiments of the invention.

BRIEF DESCRIPTION OF THE DRAWINGS

FIG. 3 is a view similar to FIG. 1, but illustrating a modified valve assembly.

FIG. 4 is a sectional view of the valve assembly of FIG. 3, taken substantially along the lines 4—4 of FIG. 3.

FIG. 5 is a view similar to FIG. 1, but illustrating another modified valve assembly.

FIG. 6 is a sectional view of the valve assembly of FIG. 5, taken substantially along the lines 6—6 of FIG. 5.

FIG. 7 is a view similar to FIG. 1, but illustrating yet another modified valve assembly.

FIG. 8 is a sectional view of the valve assembly of FIG. 7, taken substantially along the lines 8—8 of FIG. 7.

FIG. 9 is a view similar to FIG. 1, but illustrating still another modified valve assembly.

FIG. 10 is a sectional view of the valve assembly of FIG. 9, taken substantially along the lines 10—10 of FIG. 9.

DESCRIPTION OF THE PREFERRED EMBODIMENT

Figure 2:
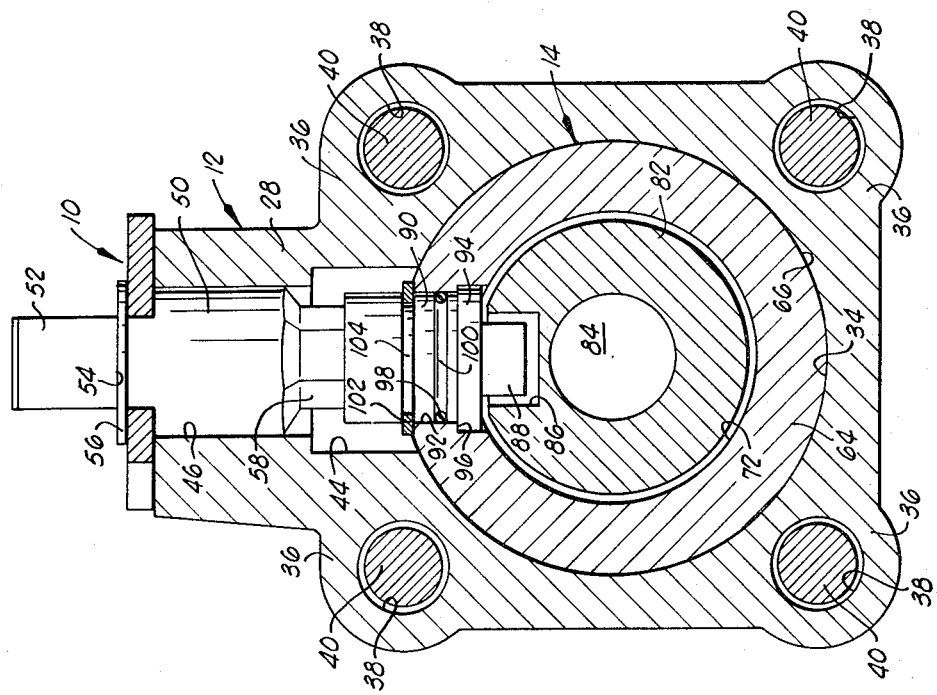
FIG. 2 is a sectional view of the valve assembly of FIG. 1, taken substantially along the lines 2—2 in FIG. 1.
Figure 1:
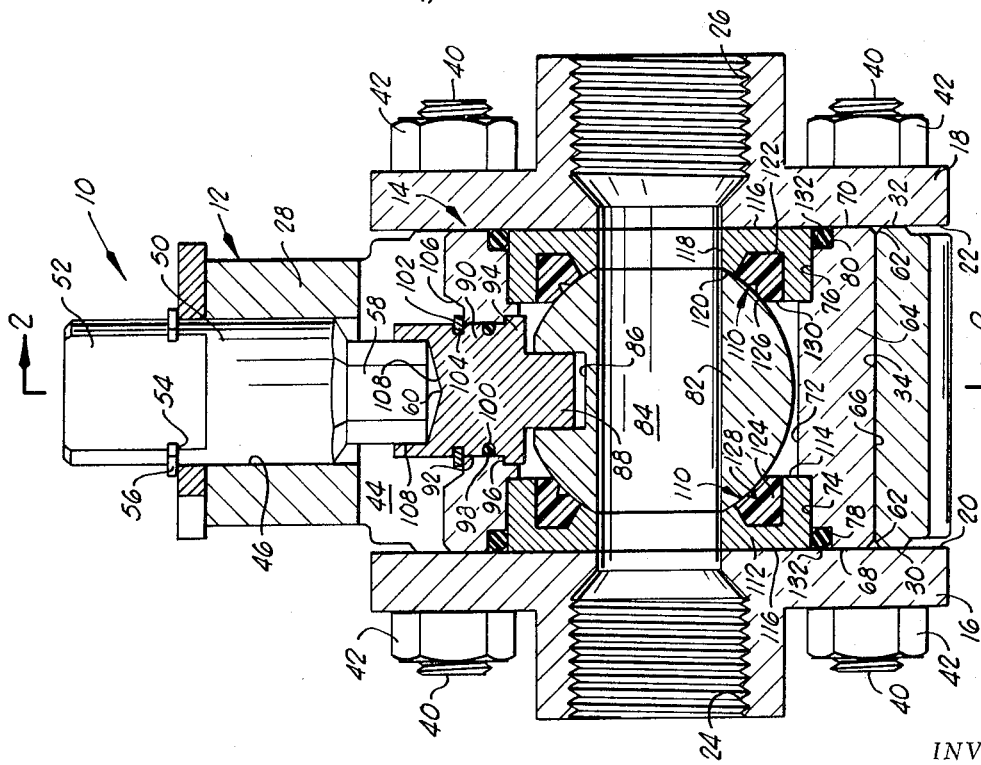
FIG. 1 is a sectional view of a valve assembly, assembled between two flanges.

Referring to the drawings in detail, and to FIGS. 1 and 2 in particular, shown therein and designated by the general reference character 10, is a valve assembly constructed in accordance with the invention. The valve assembly 10 basically comprises a housing unit 12 and a valve unit 14, and as shown more clearly in FIG. 1, the valve assembly 10 is disposed generally between flanges 16 and 18. Each of the flanges 16 and 18 includes an end face 20 and 22, and a threaded opening 24 and 26, respectively. The threaded openings 24 and 26 are axially aligned and sized to receive the threaded ends of adjacent sections of conduit (not shown).

The housing unit 12 includes a tubular housing 28 having opposite end faces 30 and 32, and a bore 34 extending therethrough. A flange portion 36 is formed on the outer periphery of housing 28 and, as shown more clearly in FIG. 2, four holes 38 are provided therethrough. The housing unit 12, the valve unit 14 and the flanges 16 and 18 are held in assembled relationship by a plurality of threaded bolts 40 that extend through the flanges 16 and 18, and through the holes 38 of the housing 28. Each of the bolts 40 is provided with a pair of threaded nuts 42 that engage the flanges 16 and 18.

A slot 44 is formed in the housing 28 along the top of the bore 34, for purposes which will become more apparent hereinafter. An aperture 46 extends transversely through the housing 28, intersecting the slot 44.

A first valve stem 50 is journaled in the housing 28 and extends through the transversely extending aperture 46. Thus, the centerline of the first valve stem 50 extends generally at a right angle to the centerline of the bore 34 of the housing 28. The upper portion 52 of first valve stem 50 is adapted to receive and cooperate with a valve handle or other appropriate operator (not shown), for turning the first valve stem 50 of the housing unit 12, and thereby rotating a valve member from a fully open to a fully closed position, as will be described fore fully hereinafter. As well known in the art, various forms of valve handles and connections may be used. In one form, for example, the valve handle is connected to the upper portion 52 of the first valve stem 50 by a pin, and includes a lug portion, that is engageable with a pair of abutments on the housing 28 to limit the rotational movement of the handle and the interconnected valve member to approximately 90°. A groove 54 is formed in the upper portion 52 of the first valve stem 50, and a retaining ring 56 is disposed in the groove 54 to limit the downward movement of the first valve stem 50 in the aperture 46.

The lower portion 58 of the first valve stem 50 is provided to have a generally hexagonal cross-section, and the lower most end portion of the lower portion 58 is tapered to an apex 60. It may be observed in FIGS. 1 and 2, that the lower portion 58 of the first valve stem 50 extends a distance into the slot 44 formed in the housing 28. The reasons for the particular positioning, and the shape of the lower portion 58 of the first valve stem 50 will become more apparent hereinafter.

The inner periphery of end faces 30 and 32 of housing 28 are provided with champhers 62 to more easily accommodate the installation of the valve unit 14, which will be more fully described hereinafter.

The valve unit 14 includes a valve body 64 having an outer periphery 66 sized to slidingly fit into the bore 34 of the housing 28, and having opposite end faces 68 and 70. The length of the body 64 corresponds to the length of the housing 28. A bore 72 extends through the valve body 64 intersecting the end faces 68 and 70, to form the valve chamber of the valve. Counterbores 74 and 76 are formed in the valve body 64 of the valve unit 14, adjacent the end faces 68 and 70, respectively. Additional counterbores 78 and 80 are formed in a portion of the counterbores 74 and 76, respectively, and are located adjacent the end faces 68 and 70.

A spherical valve member, that is, a valve ball 82, is movably disposed in the bore 72 of the valve body 64. The valve ball 82 has a port 84 extending therethrough. When the valve ball 82 is in the open position, as shown in FIGS. 1 and 2, the port 84 is axially aligned with the threaded openings 24 and 26 of the flanges 16 and 18, respectively.

The valve ball 82 has a rectangular recess 86 formed in the exterior surface thereof. The exterior recess 86 is sized to receive a rectangular end 88 formed on the lower most end portion of a second valve stem 90. The recess 86 is longer than the end 88 of the second valve stem 90 to permit movement of the valve ball 82 in a direction parallel to the bore 72 of the valve body 64 when the valve ball 82 is turned to the closed position (not shown), for reasons which will become more apparent hereinafter.

An aperture 92 extends transversely through the valve body 64, intersecting the bore 72. The second valve stem 90 extends through the transversely extending aperture 92. In addition to the rectangular end 88, the second valve stem 90 includes an exterior flange 94 that engages a downwardly facing surface 96 in the valve body 64 encircling the aperture 92 of the valve body 64 to limit the upward movement of the second valve stem 90 in the aperture 92. An O-ring seal 98 is disposed in an annular groove 100 formed in the second valve stem 90 and is arranged to provide a fluid tight seal between the valve body 64 and the second valve stem 90 thereof.

A retaining ring 102 is disposed in a second annular groove 104, which is formed in the second valve stem 90. The retaining ring 102 abuts the surface of a second slot 106 which is formed in the outer surface of the valve body 64 and thereby limits the downward movement of the second valve stem 90 in the aperture 92.

A recess 108 is formed in the upper end of the second valve stem 90. The recess 108 is sized to matingly fit the hexagonally shaped lower end portion 58 of the first valve stem 50 when the valve assembly 10 is in the assembled position, as shown in FIGS. 1 and 2, and, thus provide an interconnection therebetween. The turning movement of the first valve stem 50 is transmitted through this interconnection to the valve ball 82, as will be more fully described hereinafter.

The bore 72 and the counterbores 74 and 76 of the valve body 64 are provided to receive and cooperate with the upstream and downstream seat assemblies 110. In a preferred form, and as shown more clearly in FIG. 1, the upstream and downstream seat assemblies 110 are of identical construction, and include a relatively rigid seat ring 112, as of metal having a valve member end 114 and a non-valve member end 116. The outer periphery of each seat ring 112 is sized to fit in the respective counterbore 74 or 76 of the valve body 64. The inner periphery 118 of each seat ring 112 is axially aligned with the openings 24 and 26 of the flanges 16 and 18. The non-valve member end 116 of each seat ring 112 is shaped normal to the axis of the valve unit 14 to abut the respective end face 20 or 22 of the flange 16 or 18.

A seating surface 120 is formed on the valve member end 114 of each seat ring 112 and, in a preferred form, is configured to the shape of the exterior surface of the valve ball 82. A groove 122 is formed in the surface 120, and is provided to intersect the valve member end 114 of each seat ring 112. An elastomer 124 is disposed in the groove 122 of each seat ring 112 and, in a preferred form, is bonded thereto. The elastomer 124 is also provided with a valve member end surface 126 which is formed on a radius that is slightly less than the radius of the valve ball 82. A groove 128 is formed in the surface 126, for reasons which will be made apparent hereinafter. The seal member 124 is also provided with an end 130, which is exposed to the pressure existing in the valve chamber, for reasons which will become more apparent hereinafter.

An O-ring seal 132 is disposed in each counterbore 78 and 80 to sealingly engage the end faces 20 and 22 of the flanges 16 and 18, respectively, and to sealingly engage the ring 112 of each respective seat assembly 110.

OPERATION OF FIGS. 1 AND 2

As previously mentioned, the valve assembly 10, basically comprises two units; the housing unit 12, and the valve unit 14. The valve unit 14 will slide lengthwise into the bore 34 of the housing unit 12, the outer periphery 66 of the valve unit 14 being sized to slidingly fit into the bore 34 of the housing unit 12.

As the valve unit 14 slides into the housing unit 12, the upper portion of the second valve stem 90 will basically travel in the area provided by the slot 44 of the housing 28. The valve unit 14 is, thus, slid into the housing unit 12 to a position wherein the second valve stem 90 is in alignment with the aperture 46 of the housing 28. In this position, the end faces 30 and 32 of the housing 28 will be generally in alignment with the end faces 68 and 70 of the valve body 64.

The first valve stem 50 is inserted downwardly through aperture 46 of the housing 28 and is positioned, such that, the hexagonal end portion 58 thereof, fits into the mating bore 108 provided in the top portion of the second valve stem 90. It is to be noted that the downward movement of the first valve stem 50 in the aperture 46 will, of course, be limited by the relative position of the second valve stem 90; however, in a preferred form, the retaining ring 56 will, also, serve to limit the downward movement of the first valve stem 50. In this manner, the downward load on the second valve stem 90 and more particularly, on the retaining ring 102 of the second valve stem 90 is reduced. This type of stem, which is inserted downwardly through the housing, is generally and is sometimes referred to hereinafter as "drop-type stem."

The flanges 16 and 18 are disposed on opposite ends of the valve unit 14 and the housing unit 12, and the assembly, as shown in FIGS. 1 and 2, is held in assembled relationship by the bolts 40, which extend through the flanges 16 and 18 and through the holes 38 of the housing 28. The valve assembly 10 (shown in FIGS. 1 and 2) is then secured into position by the nuts 42, which are disposed on the opposite ends of the bolts 40.

When the valve handle (not shown) is turned, thereby turning the first valve stem 50 of the housing unit 12, the turning movement is transmitted to the valve ball 82 through the interconnection of the first valve stem 50 and the second valve stem 90. The valve ball 82 may, thus, be turned or rotated from the open position, shown in FIGS. 1 and 2, to the closed position; that is, the position wherein the port 84 of the valve ball 82 is at a right angle to the threaded openings 24 and 26 of the flanges 16 and 18. In this position, fluid will not flow through the valve.

In all operating positions of the valve assembly, it may be observed in FIGS. 1 and 2, that the fluid is isolated from the housing unit 12 by the O-rings 98 and 132. The O-ring 98 of the second valve stem 90 sealingly engages the second valve stem 90 and the walls of aperture 92 of the valve body 64 and prevents the leakage of fluid therebetween. The O-rings 132 of the valve body 64 sealingly engage the valve body 64 of the valve unit 14, the end faces 20 and 22 of the flanges 16 and 18, respectively, and each seat ring 112 of the seat assemblies 110 respectively, and thus prevents any leakage of fluid therebetween.

As previously mentioned, the rectangular end 88 of the second valve stem 90 is slightly smaller than the slot 86 in the surface of the valve ball 82. Therefore, when the valve ball 82 is turned to the closed position the valve ball 82 will be free to move upstream and downstream. It is apparent, that the valve ball 82 is of the type known in the art as a "floating" valve member, or ball. Assuming that a pressure exists in the inlet of the valve, a pressure differential will be applied across the valve ball 82, and the valve ball 82 will be moved downstream to engage the downstream seat 110. In this position, the surface of the valve ball 82 will seat against the seating surface 120 of the downstream seat assembly 110 and, since the elastomer seal member 124 extends beyond the surface 120, the surface 126 of the seal member 124 will sealingly engage the exterior surface of the valve ball 82.

When the valve ball 82 is in seated position hereinbefore described, the valve ball 82 will tend to separate the walls of the groove 128 of the downstream seal member 124. The pressure, which exists in the valve chamber, will be exerted against the valve member end surface 130 of the seal member 124, and will tend to move the walls of the groove 128 back into the position they occupied when the seal member 124 was in the relaxed position. The effect of this movement is to augment the seal formed between the seal member 124 and the exterior surface of the valve ball 82.

Should the components of the valve unit 14, such as the valve ball 82, wear to the extent that replacement or repair is necessary, the entire valve unit 14 is replaced. The first valve stem 50 is removed from the aperture 46, and the valve unit 14 is then free to be slipped out of the housing unit 12, by generally following the reverse of the procedure previously described for the insertion of the valve unit 14, and a new valve unit is installed. The valve unit 14 is assembled at the manufacturing plant under optimum conditions, therefore, the possibility of a defective seal, such as the O-ring 98 of the second valve stem 90, being replaced in the repaired valve is virtually eliminated. It is also apparent, that the above repair procedure results in a more efficient field repair of the valve, with less downtime.

In the form of the invention hereinbefore described, and as shown in FIGS. 1 and 2, the housing unit 12 is designed to provide the operational and structural strength requirements for the valve assembly 10, and the housing unit 12 is isolated from the fluid flowing through the valve as previously described. Thus, in those situations where the components of a valve in contact with the fluid must be constructed of expensive materials, such as stainless steel or ceramics, the use of such material and, therefore, the cost of the valve is kept at a minimum.

If it becomes necessary to change the service of the particular valve, wherein different materials of construction are to be used for the components in contact with the fluid flowing therethrough, a new valve unit 14 is merely inserted in the housing unit 12, thus eliminating the additional cost of a new housing unit.

The particular construction of the first valve stem 50 and the second valve stem 90 permits the first valve stem 50 to be removed without the necessity of removing the valve unit 14. The advantage is particularly important when an automatic valve operator is used to turn the first valve stem 50, because the valve operator and the first valve stem 50 can be removed and replaced, or repaired without incurring the additional time and expense of having to remove the valve unit 14.

If the first and second valve stems 50 and 90 respectively are misaligned, this results, not only in an increase in torque required to turn the valve handle, but, also, in a possibility of damage occuring to the first or second valve stems 50 or 90 respectively, at the interconnection therebetween. The generally hexagonally shaped cross-section of the interconnecting portions between the first valve stem 50 and the second valve stem 90 also provides a more positive alignment between the first valve stem 50 and the second valve stem 90, virtually eliminating the opportunity for a misalignment therebetween.

In the form of the invention shown in FIGS. 1 and 2, the slot 44 in the housing 28 may be eliminated by increasing the depth of the slot 106 in the valve body 64, such that the upper most end portion of the second valve stem 90 will lie in a plane below the plane formed by the outer periphery 66 of the valve body 64. In this manner, when the valve unit 14 is inserted into the housing 28, no passageway would be required to accommodate the travel of the second valve stem 90, since there be no portion of second valve stem 90 extending beyond the outer periphery 66 of the valve body 64.

EMBODIMENTS OF FIGS. 3 AND 4

A modified valve assembly 10a is shown in FIGS. 3 and 4, and basically comprises a modified valve unit 14a and a modified housing unit 12a. The housing unit 12a and the valve unit 14a are constructed exactly like the housing unit 12 and the valve unit 14, shown in FIGS. 1 and 2, except as hereinafter described.

The second valve stem 90a of the valve unit 14a is constructed exactly like the second valve stem 90, shown in FIGS. 1 and 2, except the second valve stem 90a is provided with an upper portion 150, which has a generally hexagonally shaped cross-section, and the upper most end portion of the upper portion 150 is tapered to an apex 152. It may be observed in FIGS. 3 and 4, that the upper portion 150 of the second valve stem 90a extends a distance into the slot 44 formed in housing 28, for reason which will become apparent hereinafter.

The first valve stem 50a is constructed exactly like the first valve stem 50, shown in FIGS. 1 and 2, except the lower portion of the first valve stem 50a extends a distance into the slot 44 of the housing 28, and terminates with a lower end 154 thereof. A recess 155, having a generally hexagonally shaped cross-section, is provided in the lower end 154 and is shaped to matingly fit the upper portion 150 of the second valve stem 90. When the valve assembly 10a is in the assembled position, as shown in FIGS. 3 and 4, the upper portion 150 of the second valve stem 90a is generally disposed in the recess 155 of the first valve stem 50a, thus providing an interconnection therebetween. The turning movement of the first valve stem 50a is transmitted through this interconnection, to the valve ball 82, as will be described in more detail hereinafter.

The valve assembly 10a is provided with upstream and downstream seat assemblies 156. In a preferred form, and as shown more clearly in FIG. 3, the upstream and downstream seat assemblies 156 are of identical construction, and include a relatively rigid, but deformable, seat ring 158, having a generally L-shaped cross-section, and leg portions 160 and 162 thereof. The seat rings 158 may be formed, for example, of a plastic material, such as Nylon, either re-inforced or unreinforced. Each seat ring 158 is provided with an inner periphery 164 and an outer periphery 166. The outer periphery 166 of each ring 158 is sized to provide a sliding fit in the respective counterbore 74 or 76 of the valve body 64. The non-valve member end 168 is shaped normal to the axis of the valve unit 14a to abut the respective end face 20 or 22 of the flange 16 or 18. A flange portion 170 is provided, extending generally radially outwardly from the outer periphery 166 of the ring 158 and having an outer periphery 172, thereof, sized to fit into the respective counterbore 78 or 80 of the valve body 64. A bead portion 174 is formed on the non-valve member end of the flange portion 170 and extends axially outwardly beyond the non-valve member end 168 of the ring 158, for reasons which will become apparent hereinafter. A notch 176 is formed in the flange portion 170 adjacent the bead 174.

An annular seal member 178 is disposed between the leg portions 160 and 162 of each ring 158. Each seal member 158 is of a more flexible material than the seat rings 158 and has a valve member end surface 180 thereon, configured to sealingly engage the exterior surface of the valve ball 82. In a preferred form, the surface 180 is formed on a radius that is slightly less than the radius of the valve ball 82. The surface 180 of each seal member 178 is further provided with a plurality of annular grooves 182 therein. Each groove 182 has a generally V-shaped cross-section.

OPERATION OF FIGS. 3 AND 4

The operation of the valve assembly 10a will be similar to that described for the valve assembly 10, shown in FIGS. 1 and 2. The valve unit 14a is inserted into the housing unit 12a to a position wherein the second valve stem 90a is aligned with the aperture 46 of the housing 28. The first valve stem 50a is inserted downwardly through the aperture 46 and positioned such that the hexagonally shaped upper portion 150 of the second valve stem 90a fits into the mating recess 155 in the lower portion 154 of the first valve stem 50a.

When the first valve stem 50a of the housing unit 12a is rotated or turned, the turning motion is transmitted to the valve ball 82 of the valve unit 10a through the interconnection of the upper end portion 150 of the second valve stem 90a and the recess 154 in the lower end portion of the first valve stem 50a. The valve ball 82 may, thus, be rotated from the open position, shown in FIGS. 3 and 4, to the closed position (not shown). It is apparent that the significant difference in this embodiment of the invention, with respect to the first and second valve stems 50a and 90a respectively, is that the first valve stem 50a fits generally over the end portion 150 of the second valve stem 90a, whereas, with respect to the embodiment of the invention shown in FIGS. 1 and 2, the lower portion 58 of the first valve stem 50 fits generally into the recess 108 of the second valve stem 90.

The flanges 16 and 18 are disposed on opposite ends of the valve unit 14a and the housing unit 12a, and the assembly, as shown in FIGS. 3 and 4, is held in an assembled relationship by the bolts 40, which extend through the flanges 16 and 18, and through the holes 38 of the housing 28. The flanges 16 and 18 are shown in FIG. 3 in a position prior to the tightening of the bolts 40 by the nuts 42. The flanges 16 and 18 are shown in this position, to more clearly illustrate the seat assemblies 156. Since the bead 174 formed on the flange portion 170 of each seat assembly 156 extends beyond the respective end face 68 or 70, of the valve body 64, it is apparent that, when the nuts 42 on the bolts 40 are tightened, the respective end face 20 or 22, of the flanges 16 or 18, will engage the bead portion 174. As the valve assembly 10a is secured into position, the bead portions 174 of each seat assembly will be compressed by the respective end face 20 and 22 of the flanges 16 and 18, and sealingly engage the end faces 20 and 22.

The fluid flowing through the valve 10a is isolated from the housing unit 12a by the O-ring 98 and the bead portions 174. The O-ring 98 of the second valve stem 90a sealingly engages the second valve stem 90a and the walls of the aperture 92 of the valve body 64, and, thus prevents the leakage of fluid therebetween. The bead portion 174 of each seat assembly 156 sealingly engages the valve body 64 of the valve unit 10a and the end faces 20 and 22 of the respective flange 16 and 18, thereby preventing any leakage of fluid therebetween. It is apparent from the foregoing that the notches 176 in the flange portions 170 are provided to accommodate the bead portions 174 as they are compressed by the flanges 16 and 18.

When the valve ball 82 is rotated to the closed position, a pressure differential will exist across the valve ball 82, causing the valve ball 82 to move downstream, in a manner as previously described. The exterior surface of the valve ball 82 will sealingly engage the surface 180 of the downstream seal member 158. The grooves 182 in the surface 180 of the seal member 178 will increase the flexibility of the seal member. The pressure in the valve chamber will act upon the seal member 178, tending to restore the seal member 178 to its relaxed position, thereby augmenting the sealing effectiveness between the seal member 178 and the valve ball 82.

The advantages of more positive positioning of the first valve stem 50a, with respect to the second valve stem 90a, and a more efficient transfer of the turning movement of the first valve stem 50a to the second valve stem 90a are, of course, retained in this embodiment of the invention, shown in FIGS. 3 and 4. Since the first valve stem 50 is inserted, or removed from the aperture 46 from the top of the housing 28, or rather is of a "drop-type" stem construction, the repair of the first valve stem 50 or the valve operator may be accomplished without having to remove the valve unit 10a. Of course, all of the advantages enumerated with respect to a valve assembly, having an insertable valve unit are present in this embodiment of the invention.

EMBODIMENT OF FIGS. 5 AND 6

The modified valve assembly 10b, shown in FIGS. 5 and 6, is also a variation of the valve assembly 10, shown in FIGS. 1 and 2. The valve assembly 10b basically comprises a modified housing unit 12b and a modified valve unit 14b, assembled between flanges 16 and 18, and held in assembled relationship by a plurality of bolts 40. The housing unit 12b and the valve unit 14b are constructed exactly like the housing unit 12 and the valve unit 14, shown in FIGS. 1 and 2, with the exception of the first valve stem 50b, and the upstream and downstream seat assemblies 200, which will be described in detail hereinafter.

The first valve stem 50b is constructed exactly like the first valve stem 50, shown in FIG. 1 and 2, except the lower portion of the first valve stem 50b, shown in FIGS. 5 and 6, extends a distance into the slot 44 and terminates with a lower end 202. A recess 204, having a generally hexagonal cross-section, is provided in the lower end 202 of the first valve stem 50b. The recess 204 is provided to be identical, with respect to shape, to the recess 108 formed in the second valve stem 90, for reasons which will become apparent hereinafter. A retaining ring 206 is disposed in a groove 208, which is formed in the outer periphery of the first valve stem 50b. The retaining ring 206 is positioned such that, in an assembled position, as shown in FIGS. 5 and 6, the retaining ring 206 will abut the wall formed by the slot 44 in the housing 28, and thereby, prevent the upward movement of the first valve stem 50b in the aperture 46. It is apparent, that the retaining ring 206 may be omitted by providing a valve operator having a flange portion which may be secured to the housing 28.

A pin 210, having a generally hexagonally shaped cross-section and basically comprising, a body 212, and opposite tapered ends 214 and 216, is disposed generally between the first valve stem 50b and the second valve stem 90. The end 214 and a portion of the body 212 of the pin 210 is disposed in the mating recess 108 of the second valve stem 90, and the end 216 and a portion of the body 212 is disposed in the mating recess 204 of the first valve stem 50b. It is apparent that the pin 212 provides the interconnection between the first valve stem 50b and the second valve stem 90.

The upstream and downstream seat assemblies 200 are disposed in the respective counterbores 74 and 76 of the valve body 64. As clearly shown in FIGS. 5 and 6, the upstream and downstream seat assemblies, in a preferred form, are of identical construction. Each seal assembly 200 comprises a seat ring 218 having a valve member end 220, a non-valve member end 222, an inner periphery 224, and an outer periphery 226. Each seat ring 218 is formed of a plastic material, such as Nylon. The outer periphery 226 of each seat ring 218 is sized to fit into the respective counterbore 74 or 76 of the valve body 64. The inner periphery 224 of each seat ring 218 is axially aligned with the respective flange opening 24 or 26 when the valve assembly 10b is in the assembled position as shown in FIGS. 5 and 6. In this position the non-valve member end 222 of each seat ring 218 abuts the respective end face 20 or 22 of the flange 16 or 18.

A surface 228 is formed on the valve member end 220 of each seal ring 218 and, in a preferred form, is configured to the shape of the exterior surface of the valve ball 82. Annular grooves 230 are formed in the surface 228 and, in a preferred form, are provided to have a generally V-shaped cross-section.

A flange portion 232 is formed on the outer periphery 226 of each seat ring 218, and extends generally radially outwardly therefrom. The outer periphery 234 of each flange portion 232 is sized to fit into the respective counter bore 78 or 80 of the valve body 64. A bead 236 is formed on the non-valve member end of the flange portion 232 and extends axially outwardly a distance beyond the non-valve member end of the flange portion 232. A notch 238 is formed in the flange portion 232, adjacent the bead 236, for reasons which will become apparent hereinafter.

From the foregoing description, it is apparent that the seat assemblies 200, shown in FIGS. 5 and 6, are constructed similar to the seat assemblies 156, shown in FIGS. 3 and 4. The significant difference between the seat assemblies 200 and 156, being that the seat assemblies 200, comprise a solid integral structure, whereas the seat assemblies 156 have the seal member 180 disposed in the seat ring 158.

OPERATION OF FIGS. 5 AND 6

The operation of the valve assembly 106 is similar to that described for the valve assembly 10, shown in FIGS. 1 and 2, and for the valve assembly 10a, shown in FIGS. 3 and 4.

The pin 210 is disposed in the recess 108 of the second valve stem 90, and the valve unit 14b is inserted in the housing unit 12b, to a position, wherein the second valve stem 90 is generally aligned with the aperture 46 of the housing 28. The first valve stem 50b is inserted downwardly through the aperture 46, and is positioned such that the recess 204 of the first valve stem 50b matingly fits over the pin 210. It is apparent that this embodiment of the invention also describes a "drop-type" stem referred to hereinabove.

When the first valve stem 50b of housing unit 12b is rotated, or turned, the turning motion is transmitted to the valve ball 82 of the valve unit 14b through the interconnection provided by the pin 210, which matingly fits into the recesses 204 and 108 of the first valve stem 50b and the second valve stem 90, respectively. The valve ball 82 may, thus, be rotated from the open position, shown in FIGS. 5 and 6, to the closed position (not shown). The retaining ring 206 is disposed in the groove 208 of the first valve stem 50b, after the first valve stem 50b has been placed in the assembled position, to prevent the upward movement of the first valve stem 50b in the aperture 46. The slot 44 of the housing 28 provides ample space to inable the insertion of the retaining ring 206 after the valve unit 14b has been inserted in the housing unit 12b. The retaining ring, in a preferred form, is of the "split-ring" type, so that it may be inserted in this manner.

The valve assembly 10b is held in an assembled relationship by the volts 40, in a manner exactly like that described for the valve assembly 10, shown in FIGS. 1 and 2. The flanges 16 and 18 are shown in FIG. 3 in a position prior to the tightening of the bolts 40 by the nuts 42. The flanges 16 and 18 are shown in this position to more clearly illustrate the seat assemblies 200. The seat assemblies 200 will operate exactly like the seat assemblies 156 of the valve assembly 10a, shown in FIGS. 3 and 4. The only significant difference between the two seat assemblies 156 and 200, is that the seat assembly 156 employes a separate seal member 178 disposed therein, whereas the seat assembly 200 is of a one-piece on integral construction.

The fluid flowing through the valve is isolated form the housing unit 12b by the O-ring 98 and the bead portions 236. The O-ring 98 of the second valve stem 90 sealingly engages the second valve stem 90 and the walls of the aperture 92 of the valve body 64, and, thus prevents the leakage of fluid therebetween. When the bolts 40 are tightened, it is apparent that the end faces 20 and 22 of the flanges 16 and 18 will sealingly engage the bead portions 236 of the respective seat assemblies 200, thereby preventing any leakage of fluid therebetween.

This embodiment of the invention retains the advantages of the "drop-type" stem construction, referred to hereinbefore, such as a more positive positioning of the first valve stem 50b, with respect to the second valve stem 90, and is a more efficient transfer of the turning movement of the first valve stem 50b to the second valve stem 90. Also, since the second valve stem 50b is inserted from the top of the housing unit 12b, after the valve unit 14b has been inserted into position, it is apparent that the first valve stem 50b and the valve operator may be removed and replaced or repaired without having to remove the valve unit 14b.

EMBODIMENT OF FIGS. 7 AND 8

The valve assembly 10c, shown in FIGS. 7 and 8, is a slight modification of the valve assembly 10, shown in FIGS. 1 and 2. The first valve stem 50c, the second valve stem 90c, and the upstream and downstream seat assemblies 250, represent the only significant modifications in the valve assembly 10c, and will be described in detail hereinafter.

The second valve stem 90c is constructed exactly like the second valve stem 90 of valve assembly 10, except the upper end 252 thereof is generally cylindrically shaped, having a tapered end portion 254, and extends a distance generally upward into the slot 44 of the housing 28. An aperture 256 is provided in the upper end 252, and extends therethrough for reasons which will become apparent hereinafter.

The first valve stem 50c is constructed exactly like the first valve stem 50, except the lower end of the first valve stem 50c extends a distance into the slot 44 of the housing 28 and terminates with an end surface 258. A recess 260 is provided in the end surface 258 and is shaped to mate with the upper end 252 of the second valve stem 90c. A pair of apertures 262 extend through the walls formed in the first valve stem 50c by the recess 260. The apertures 262 are in alignment and are located, such that, when the upper end 252 of the second valve stem 90c is disposed in the recess 260, or in otherwords, when the valve assembly 10c is in the assembled position, as shown in FIGS. 7 and 8, the apertures 262 of the first valve stem 50c are in alignment with the aperture 256 of the second valve stem 90c. In this position, and as shown in FIGS. 7 and 8, a pin 264 is extended through the apertures 262 of the first valve stem 50c, and through the aperture 256 of the second valve stem 90c, thereby interconnecting the first valve stem 50c and the second valve stem 90c.

The seat assemblies 250, in a preferred form, are of identical construction and basically comprise a relatively rigid seat ring 266, having a valve member end 268, a non-valve member end 270, an inner periphery 272, and an outer periphery 274. The inner periphery 272 of each seat ring 266 is axially aligned with the respective flange opening 24 or 26, when the valve assembly 10c is in the assembled position, as shown in FIGS. 7 and 8. In this position, the non-valve member end 270 of each seat ring 266 abuts the respective end face 20 or 22 of the flange 16 or 18. The outer periphery 274 of each seat ring 266 is sized to fit into the respective counterbore 74 or 76 of the valve body 64.

A seating surface 276 is formed on the valve member end 268 of each seat ring 266 and, in a preferred form, is configured in the shape of the exterior surface of the valve ball 82. A groove 278 is formed in the seating surface 276 and is adjacent and intersects the inner periphery 272 of each seat ring 266. A seal member 280 is disposed in the groove 278 and, in a preferred form, is bonded thereto. The seal member is provided with a valve member end surface 282, which sealingly engages the valve ball 82, and an inner periphery 284, which is exposed to the pressure existing in the respective flange opening 24 or 26, for reasons which will become apparent hereinafter.

OPERATION OF FIGS. 7 AND 8

The valve assembly 10c may be assembled in a manner similar to that described for the valve assembly 10, shown in FIGS. 1 and 2. In particular, the valve unit 14c is slid lengthwise into the bore 34 of the housing unit 12c, to a position wherein the second valve stem 90c is in alignment with the aperture 46 of the housing 28. The upper portion 252 of the second valve stem 90c will basically travel in the area provided by the slot 44 of the housing 28 as the valve unit 14c is slid into the housing unit 12c.

The first valve stem 50c is inserted downwardly through the aperture 46 of the housing 28 and is positioned such that the upper end 252 of the second valve stem 90c is disposed in the recess 260 of the first valve stem 50c. The first valve stem 50c is rotated to a position wherein the apertures 262 thereof are in alignment with the aperture 256 in the upper portion 252 of the second valve stem 90c. In this position, the pin 264 is inserted through the apertures 262 and the aperture 256, thereby interconnecting the first valve stem 50c and the second valve stem 90c. It is apparent that the pin 264 not only serves to provide the interconnection between the said valve stems, but the pin 264, also limits the upward movement of the first valve stem 50c in the aperture 46.

The valve assembly 10c is held in an assembled relationship, as shown in FIGS. 7 and 8, by a plurality of bolts 40 in a manner exactly like that described for the valve assembly 10 shown in FIGS. 1 and 2.

When the valve handle, or operator (not shown) is turned, thereby turning the first valve stem 50c of the housing unit 12c, the turning movement is transmitted to the valve ball 82 through the interconnection of the first valve stem 50c and the second valve stem 90c. In this embodiment of the invention, it is apparent that the rotational distance traveled by the first valve stem 50c before engagement with the second valve stem 90c through the interconnection provided by the pin 264, will be limited by the tolerance provided between the pin 264 and the apertures 256 and 262. This tolerance may, of course, be simply controlled and, thus, provide an even greater efficiency in the transmission of the turning movement of first valve stem 50c to the second valve stem 90c. The general alignment between the first valve stem 50c and the second valve stem 90c is also assured in this embodiment of the invention by the pin 264, and the maintaining of the close tolerance between the pin 264 and the apertures 256 and 262.

When the valve ball 82 is turned to a closed position, a pressure differential will exist across the valve ball 82, and it will move downstream in a manner exactly like that described for the valve 10, shown in FIGS. 1 and 2. In the closed position, the exterior surface of the valve ball 82 will seatingly engage the surface 276 of the downstream seat assembly 250, and the seal member 280 will sealingly engage the valve ball 82.

The seal member 280 is provided with an inner periphery 284, which is exposed to the pressure existing in the respective flange opening 24 or 26. It is therefore apparent that in the upstream position of the seat assembly 250, the pressure in the flange opening will act upon the inner periphery 284 and, thus, augment the sealing engagement between the seal member 280 and the valve ball 82.

It is apparent that this embodiment of the invention, shown in FIGS. 7 and 8, provides not only a positive positioning of the first valve stem 50c and the second valve stem 90c, with respect to the axial positioning thereof, but also, with respective to the radial positioning thereof. Since the interconnection between the first valve stem 50c and the second valve stem 90c, is provided by the pin 264, the eventual wearing which will occur at the interconnection is concentrated on the pin 264. It is therefore apparent that the pin 264, which is a smaller and less expensive item, can be replaced, rather than having to replace the first valve stem 50c and the second valve stem 90c, which has been the procedure in the past when wearing has occurred at the interconnection.

The valve assembly 10c, of course, provides a more positive positioning of the valve ball 82 and a more efficient transfer of the turning movement of the first valve stem 50c to the valve ball 82, in a manner similar to that provided with respect to the embodiment shown in FIGS. 1 and 2. All of the advantages associated with a valve having an insertable valve unit are also present in this embodiment of the invention.

EMBODIMENT OF FIGS. 9 AND 10

Another valve assembly, which is constructed in accordance with the invention, is shown in FIGS. 9 and 10, and is designated by the general reference character 300. The valve assembly 300 basically comprises a housing unit 302 and a valve unit 304.

The housing unit 302 includes a housing 306 having opposite end faces 308 and 310, and a bore 312 extending therethrough. A slot 314 is formed in the housing 306 along the top of the bore 312 for reasons which will become apparent hereinafter. An aperture 316 extends transversely through the housing 306 intersecting the slot 314.

A first valve stem 318 is journaled in the housing 306, and extends through the transversely extending aperture 316. A handle 320 is connected to the upper end of the first valve stem 318 by a pin 322. The handle includes a flange portion 324 that is engageable with a pair of stop pins 326 (only one is shown) to limit the rotational movement of the handle 320 to approximately 90°. The stop pins 326 are disposed in a pair of holes 328 (only one is shown) in the housing 306. It may be observed in FIGS. 9 and 10 that the handle 320 will limit the downward movement of the first valve stem 318 in the aperture 316. Although the embodiment of the invention in FIGS. 9 and 10 is shown using a handle 320, it is obvious that any type of valve operator may be used.

The lower portion 330 of the first valve stem 318 is formed in the shape of a hexagon, and the lower most end portion of the lower portion 330 is tapered to form an apex 332. It may be observed in FIGS. 9 and 10, that the lower portion 330 of the first valve stem 318 extends a distance into slot 314 formed in the housing 306. The reasons for the particular positioning and the shape of the lower portion 330 of the first valve stem 318 will be more apparent hereinafter. A retaining ring 334 is disposed in a groove 336, which is formed in the outer periphery of the first valve stem 318. The retaining ring 334 is positioned such that, in an assembled position as shown in FIGS. 9 and 10, the retaining ring will abut the wall formed by the slot 314 in the housing 306, and thereby prevent the upward movement of the first valve stem 318 in the aperture 316. It is apparent, that the retaining ring 334 may be omitted by providing a valve operator with a flange portion which may be secured to the housing 306.

A pair of flanges 338 extend outwardly from the housing 306 and two bolt holes 340 are provided extending therethrough, for reasons which will become apparent hereinafter.

The valve unit 304 includes a valve body 342 having an outer periphery 344 sized to slidingly fit into the bore 312 of the housing 306, and opposite end faces 346 and 348. The length of the valve body 342 should be approximately the same as the length of the housing 306. A bore 350 extends through the valve body 342, intersecting the end faces 346 and 348. Counterbores 352 and 354 are formed in the valve body 342 adjacent the end faces 346 and 348, respectively.

An upper and lower aperture 356 and 358 are provided transversely extending through the valve body 342. As shown in FIGS. 9 and 10, the upper and lower apertures 356 and 358 of the valve body 342 are in alignment for reasons which will be made apparent hereinafter.

A disc or butterfly valve member 360, having an outer periphery 362, is movably disposed in the bore 350 of the valve body 342. A second valve stem 364 extends upwardly from the disc 360, through the transversely extending aperture 356 of the valve body 342, and terminates with an upper surface 366 formed thereon. It is apparent that the upper surface 366 of the second valve stem 364 lies in a plane which is positioned to be slightly below the plane formed by the outer periphery 344 of the valve body 342, when the valve assembly 300 is in the assembled position as shown in FIGS. 9 and 10. A recess 368 is formed in the surface 366 of the second valve stem 364, and is provided to matingly fit the hexagonally shaped lower portion 330 of the first valve stem 318.

A third valve stem 370 extends downwardly from the disc 360 through the transversely extending lower aperture 358 of the valve body 342. A conical-shaped portion 372 is formed on the outer end of the third valve stem 370 and is provided with an end point or apex 374. In an assembled position, as show in FIGS. 9 and 10, the apex 374 of the third valve stem 370 is in engagement with the housing 306. The second and third valve stems 364 and 370, respectively, may be either rigidly secured to the disc 360, as by pinning, or may be formed integrally with the disc 360, as desired. It will be apparent that, if the stems 364 and 370 are formed integrally with the disc 360, the valve body 342 will need to be split in order to assemble the disc in the valve body 342.

An elastomer 376, having an inner periphery 378 and opposite ends 380 and 382, is bonded to the walls of the bore 350 and the counterbores 352 and 354 of the valve body 342, and forms the seat for the valve unit 304. It may be observed in FIG. 9, that the ends 380 and 382 of the elastomer 376 project axially outwardly beyond the ends 346 and 348 of the valve body 342, for reasons which will become apparent hereinafter.

The elastomer 376 surrounds the stems 364 and 370, and is provided with surfaces 384, 386, 388, and 390, which sealingly engage said stems. The inner periphery 378 of the elastomer 376 is tapered from both ends 380 and 382 thereof, to a position wherein the inner periphery of the central portion thereof is of a smaller diameter than the diameter 362 of the disc 360. For example, the inner diameter of the central portion of the elastomer 376, in a relaxed condition thereof, may be 0.040 inch less than the outer diameter of the disc 360. Thus, when the disc 360 is in the closed position, as shown in FIGS. 9 and 10, the outer periphery 362 of the valve disc 360 will seat on the central portion of the elastomer 376 with an interference fit. In a preferred form, the valve body 342, the elastomer 376 and the disc 360 of the valve unit 304 are molded together to provide a unitary structure of the valve unit 304, which can then be inserted lengthwise into the housing 306 as will be described in more detail hereinafter.

OPERATION OF FIGS. 9 AND 10

The valve unit 304 is inserted lengthwise into the housing unit 302, in a manner similar to that described previously for the other embodiments of the invention, in particular the valve assembly 10, as shown in FIGS. 1 and 2. The valve unit 304 is slid into the housing unit 302 to a position wherein the second valve stem 364 is in alignment with the aperture 316 of the housing 306. The first valve stem 318 is then inserted downwardly through the aperture 316 of the housing 306, and is positioned such that the hexagonal end portion 330 thereof matingly fits into slot 368 provided in the top portion of the second valve stem 364. The interconnection between the first valve stem 318 and the second valve stem 364 is thus provided in a manner exactly like that shown for the valve assembly 10, as shown in FIGS. 1 and 2. The retaining ring 334 is disposed in the groove 336 of the first valve stem 318, after the first valve stem 318 has been inserted in the aperture 316, to prevent the upward movement of the first valve stem 318 in the aperture 316. The slot 314 of the housing 306 provides ample space to facilitate the insertion of the retaining ring 334 after the valve unit 304 has been inserted in the housing unit 302. The retaining ring 334 is of the split-ring type so that it may be inserted in this manner.

The valve assembly 300 is provided such that it may be installed between two flanges (not shown). When the valve assembly 300 is disposed between the two flanges it will be held in an assembled relationship by a plurality of bolts (not shown). Two of the bolts will extend through the flanges and through the holes 340 provided therefor in the housing 306, and the remaining bolts will extend around the outer periphery of housing 306 of housing unit 302. The valve assembly 300 would then be secured in position by nuts (not shown), which would be disposed on opposite ends of the bolts. As the nuts are tightened, the end faces of the flanges will engage the respective end faces 346 and 348 of the valve body 342, and will also abut the respective end faces 308 and 310 of the housing 306. It is apparent that the ends 380 and 382 of the elastomer 376 will be compressed by the flanges and will sealingly engage the end faces of the flanges, thereby preventing leakage of fluid therebetween.

The turning movement of the valve handle 320 of the housing unit 302 is transmitted to the disc 360 through the interconnection provided at the hexagonally shaped end portion 330 of the first valve stem 318 and the recess 368 of the second valve stem 366. The valve disc 360 of valve unit 304 may thus be rotated from an open position (not shown), to the closed position, as shown in FIGS. 9 and 10. As the valve disc 360 is rotated, it is apparent from FIGS. 9 and 10, that the third valve stem 370 of valve unit 304 will rotate, following the rotational movement of the valve disc 360. The third valve stem 370 of the valve unit 304 will rotate on the apex 374 thereof, which is in engagement with the housing 306.

When the valve disc 360 of the valve unit 302 is in the closed position, no fluid will flow through the valve since the outer periphery 362 of the valve disc 360 will be in sealing engagement with the inner periphery 378 of the elastomer 376. In all positions of the disc 360, the fluid is isolated from the housing unit 302 by the elastomer 376 sealingly engaging the flanges (not shown) at the opposite ends of the valve and the second and third valve stems 364 and 370, respectively.

Since the components of the housing unit 302 will not be in contact with the fluid flowing through the valve, the housing unit 302 may be constructed of any material, such as cast iron or cast steel, the main consideration being strength and the economical construction. It is therefore, apparent that the material used in the construction of the valve unit 304 may be kept to a minimum, similar to that described for valve unit 14 of FIGS. 1 and 2. Should replacement of the valve unit 304 become necessary, the valve unit 304 is simply slipped out of the housing unit 302 by following the procedure basically described for the insertion of the valve unit 302, and thus it may be easily and quickly replaced or interchanged. This embodiment of the invention shown in FIGS. 9 and 10, therefore, incorporates the advantages of less down time and the elimination of the possibility of installing a valve unit with defective seals similar to that described for the valve assembly 10 shown in FIGS. 1 and 2. Since the embodiment of the invention describes a "drop-type" stem construction, similar to that shown in FIGS. 1 and 2, it is apparent that the valve assembly 300 will also provide a more positive positioning of the disc 360, and a more efficient transfer of the turning movement of the first valve stem 318 to the disc 360. The valve handle 320 or a valve operator may be repaired without removing the valve unit 304.

From the foregoing it will be apparent that the present invention provides a valve assembly, wherein the general alignment between the first and second valve stems thereof is more positive. This positive alignment virtually eliminates the possibility of misalignment, which results in an increased torque being required to turn the first valve stem and eventual damaging at the interconnection between the first and second valve stems.

The interconnections shown in the various embodiments of the invention also provide a more efficient transfer of the turning movement of the first valve stem to the valve ball and, therefore, a more positive positioning of the valve ball or valve disc. Further, since the first valve stem, as shown in the various embodiments is inserted downwardly from the top of the housing unit, it is possible, using the present invention, to repair the valve operator, or valve handle without the necessity of removing the valve unit.

Since the various embodiments of the invention are shown with a valve having an insertable valve unit, all of the advantages of such a valve are present in the various embodiments. A valve having an insertable valve unit is quickly and easily repaired in the field by simply inserting a new valve unit in an existing housing unit. Since, the valve unit is assembled at the manufacturing plant under optimum conditions with respect to time, and the availability of the proper tools and test equipment, the chance that a repaired valve is assembled in the field with a damaged or defective stem seal is virtually eliminated.

In those applications where the specifications require the components of the valve in contact with the fluid to be constructed of expensive, or exotic materials, such as stainless steel or ceramics, it is apparent from the foregoing, that the present invention provides a valve assembly wherein the material required for those components may be maintained at a minimum.

Changes may be made in the construction and arrangement of the parts or elements of the various embodiments as disclosed herein without departing from the spirit and scope of the invention as defined in the following claims.

What is claimed is:

1. A valve assembly for controlling the flow of fluid between a pair of adjacent pipe sections, comprising:
   a valve unit, comprising:
     a valve body having a valve chamber therein communicating with the opposite ends of the valve body;
     means sealing the opposite ends of the body to the pipe sections;
     a valve member supported in the valve chamber for opening and closing the valve assembly;
     a valve stem supported in the valve body having an inner end and an outer end, said inner end being connected to the valve member, and said outer end being exposed to the exterior of the valve body;
     means sealing the valve stem in the valve body; and
   a housing unit, comprising:
     a housing having a bore therethrough sized to slidingly receive the assembled valve unit;
     means supporting the housing between and by the adjacent pipe sections; and
     a valve stem supported by the housing in alignment with the valve stem carried by the valve body when the valve unit is positioned in operating position in the housing unit, said stem carried by the housing having an inner end adapted to be connected to the outer end of the stem carried by the valve body when the stem carried by the housing is moved lengthwise toward the valve body, whereby the valve member may be moved between open and closed positions by operation of the stem carried by the housing; and
     the valve unit may be removed from the housing in an assembled condition only when the stem carried by the housing is moved lengthwise in the opposite direction out of engagement with the valve stem carried by the valve body.

2. A valve assembly for controlling the flow of fluid between a pair of aligned pipe flanges interconnected by a plurality of circumferentially spaced bolts, comprising:
   a valve unit, comprising:
     a valve body having a valve chamber therein communicating with the opposite ends of the valve body;
     means sealing the opposite ends of the valve body to the flanges;
     a valve member supported in the valve chamber for opening and closing the valve assembly;
     a valve stem supported in the valve body and having an inner end and an outer end, said inner end being connected to the valve member and said outer end being exposed to the exterior of the valve body;
     means sealing the valve stem in the valve body; and
   a housing unit, comprising:
     a housing adapted to be supported between the flanges by the bolts, said housing having a bore therethrough receiving and supporting the assembled valve unit with the valve body in alignment with the flanges; and
     a valve stem carried by the housing having an inner end adapted to be connected to the outer end of the stem carried by the valve body when the stem carried by the housing is moved lengthwise toward the valve body, whereby the valve member can be moved between open and closed positions by operation of the valve stem carried by the housing; and
     the valve unit may be removed from the housing in an assembled condition only when the stem carried by the housing is moved lengthwise in the opposite direction out of engagement with the valve stem carried by the valve body.

3. The valve assembly of claim 1 wherein the valve unit is sized to be slid lengthwise into the housing.

4. The valve assembly of claim 3 wherein the housing is sized to encompass the valve body when the valve body is inserted into the housing, and provides radial support for the valve body.

5. The valve assembly of claim 1 wherein the valve body is generally cylindrical in shape and the bore in the housing is cylindrical in shape to slidingly mate with the valve body.

6. The valve assembly of claim 1 wherein a recess is provided in the inner end of the housing valve stem; and wherein the outer end portion of the body valve stem is provided to matingly fit into said recess.

7. The valve assembly of claim 1 wherein a recess is provided in the outer end of the body valve stem; and wherein the inner end portion of the housing valve stem is provided to matingly fit into said recess.

8. The valve assembly of claim 1 further defined to include a pin having an outer and an inner end, a recess is provided in the outer end of the body valve stem; and wherein a recess is provided in the inner end of the housing valve stem; the outer end portion of said pin being sized and shaped to matingly fit into the recess in the inner end of the housing valve stem and the inner end portion of the pin being sized and shaped to matingly fit into the recess in the outer end of the body valve stem, thereby providing the interconnection between said housing and body valve stems.

9. The valve assembly of claim 6 wherein mating transverse apertures are provided in the inner end of the housing valve stem and in the outer end portion of the body valve stem, and wherein the valve assembly is defined further to include a pin shaped to matingly extend through mating apertures, thereby providing the interconnection between said housing and body valve stems.

10. The valve assembly of claim 6 wherein the outer end portion of the body valve stem is provided to have a generally hexagonally shaped cross-section.

11. The valve assembly of claim 7 wherein the inner end portion of the housing valve stem has a generally hexagonally shaped cross-section.

12. The valve assembly of claim 8 wherein the pin is provided to have a generally hexagonally shaped cross-section.

13. The valve assembly of claim 1 wherein the body valve stem includes a groove in the outer periphery thereof and a retaining ring in said groove engaging the valve body to limit the movement of the body valve stem in one direction.

14. The valve assembly of claim 1 wherein the body valve stem includes a flange portion on one end portion thereof engaging the valve body to limit the movement of the body valve stem in one direction.

15. The valve assembly of claim 1 wherein said means sealing the body valve stem in the body comprises a groove encircling the outer periphery of the body valve stem, and an O-ring in said groove sealingly engaging the valve body to form a fluid tight seal therebetween.

16. The valve assembly of claim 2 wherein the housing includes a slot formed along the inner periphery thereof to receive said body valve stem when the valve unit is being inserted in and removed from the housing unit.

17. The valve assembly of claim 2 wherein a recess is formed in a portion of the outer periphery of said valve body; and wherein the body valve stem includes a groove in the outer periphery thereof; and a retaining ring in said groove engaging the valve body and generally disposed in said recess to limit the inward movement of the body valve stem, said recess being of a sufficient depth so that the outer end of the body valve stem will not extend beyond the outer periphery of the valve body.

18. The valve assembly of claim 2 wherein the valve member is spherical in shape, and characterized further to include seat means in the valve chamber cooperating with the valve member when the valve member is closed.

19. The valve assembly of claim 2 wherein the valve member is a disc, and characterized further to include seat means in the valve chamber cooperating with the valve member when the valve member is closed.

20. The valve assembly of claim 18 wherein the seat means includes a seat ring disposed in the valve chamber, and a seal member supported by the seat ring sealingly engaging the valve member.

21. The valve assembly of claim 18 wherein the seat means includes a seat ring disposed on each side of the valve member, and a seal member supported by each of said seat rings, each seal member adapted to engage the valve member thereby providing upstream and downstream seats.

22. The valve assembly of claim 21 wherein the means sealing the opposite ends of the valve body to the flanges includes, an O-ring disposed between each seat ring and the valve body to form a seal therebetween, a portion of each of said O-rings sealingly engaging the respective flange.

23. The valve assembly of claim 18 wherein the seat means includes; a seat ring in the valve chamber and having a valve member end and a non-valve member end, the valve member end of the seat ring being provided with a seating surface formed thereon, said seating surface being shaped to mate with the exterior surface of the valve member; and, a seal member bonded to the valve member end of said seat ring, said seal member having a surface shaped to sealingly engage said valve member.

24. The valve assembly of claim 23 wherein a groove is formed in said seating surface, and the seal member is disposed in said groove, said seal member having a portion thereof extending beyond the seating surface of the seat ring to sealingly engage the valve member.

25. The valve assembly of claim 24 wherein said seal member is bonded to the walls of said groove.

26. The valve assembly of claim 24 wherein the seal member is provided with an end portion thereof exposed to the fluid pressure existing in the valve chamber.

27. The valve assembly of claim 24 wherein an annular groove is formed in the surface of said seal member which sealingly engages the ball valve member.

28. The valve assembly of claim 24 wherein the seal member is provided with an end portion exposed to the fluid pressure existing in the adjacent flange opening.

29. The valve assembly of claim 18 wherein the seat means includes:
a seat ring disposed in the valve chamber on one side of the valve member, and having a generally "L-shaped" cross-section forming two legs thereon,
a seal member supported between the two legs of the seat ring, said seal member having a valve member end surface shaped to mate with the exterior surface of the valve member, and said valve member end surface having a plurality of annular grooves formed thereon; and
a flange portion extending radially outwardly from said seat ring, having a valve member end and a non-valve member end, and an annular bead formed on the non-valve member end of said flange portion, said annular bead being sized to sealingly engage the respective flange.

30. The valve assembly of claim 18 wherein the seat means includes:
a seat ring disposed on each side of the valve member and having a generally "L-shaped" cross-section forming two legs thereon,
a seal member supported between the two legs of each seat ring, each seal member having a valve member end surface shaped to mate with the exterior surface of the valve member, and each of said valve member end surfaces having a plurality of annular grooves formed thereon; and
a flange portion extending radially outwardly from each seat ring having a valve member end and a non-valve member end, and an annular bead formed on the non-valve member end of said flange portion, said annular bead being sized to sealingly engage the respective flange.

31. The valve assembly of claim 29 wherein the seal member is bonded to the two legs of the seat ring.

32. The valve assembly of claim 30 wherein each seal member is bonded to the two legs of the respective seat ring.

33. The valve assembly of claim 18 wherein the seat means includes:
a seat ring having a valve member end and a non-valve member end, and a seating surface on the valve member end thereof, said seating surface being shaped to mate with the exterior surface of the valve member, and having a plurality of annular grooves formed thereon; and
a flange portion extending radially outwardly from said seat ring having a valve member end and a non-valve member end, and an annular bead formed on the non-valve member end of said flange portion, said annular bead being sized to sealingly engage the respective flange.

34. The valve assembly of claim 18 wherein the seat means includes:
a seat ring, having a valve member end and a non-valve member end, disposed on each side of the valve member, a seating surface being formed on the valve member end of said seat ring, said seating surface being shaped to mate with the exterior surface of the ball valve member, and having a plurality of annular grooves formed therein; and
a flange portion extending radially outwardly from each seat ring, having a valve member end and a non-valve member end, and an annular bead formed on the non-valve member end of said flange portion, said annular bead being sized to sealingly engage the respective flange.

35. The valve assembly of claim 19 wherein the seat means includes an elastomer bonded around the inner periphery of the valve chamber having a central portion thereof shaped to sealingly engage the disc valve member when the disc valve member is turned to the closed position.

36. The valve assembly of claim 35 wherein the central portion of the seat means in the relaxed condition thereof, has a diameter less than the outer diameter of the disc valve member, and the diameter of the seat means on opposite sides of said central portion is progressively increased toward the ends of the valve body.

37. The valve assembly of claim 35 wherein the seat means extends over a portion of each end of the valve body and sealingly engages the flanges.

38. The valve assembly of claim 35 wherein the elastomer includes a surface sealingly engaging the body valve stem, thereby providing a fluid-tight seal between the body valve stem and the valve body.

39. The valve assembly of claim 19 wherein the valve unit includes another valve stem in the valve body having an inner and outer end, said inner end engaging the disc valve member.

40. The valve assembly of claim 39 wherein the last-mentioned valve stem is journaled in the valve body.

41. The valve assembly of claim 40 wherein the outer end of the last mentioned valve stem is in engagement with the inner periphery of the bore in the housing when the valve unit is inserted into the housing unit.

42. The valve assembly of claim 40 wherein the valve unit includes seal means between the last-mentioned valve stem and the valve body providing a fluid tight seal therebetween.

43. The valve assembly of claim 40 wherein said elastomer includes a surface sealingly engaging the last-mentioned valve stem, thereby providing a fluid tight seal between the last-mentioned valve stem and the valve body.

* * * * *